Jan. 6, 1959 W. M. PARKER, JR 2,867,349
MOLDED PLASTIC ARTICLES SUCH AS OUTLET BOXES
Filed Oct. 1, 1953 2 Sheets-Sheet 1

INVENTOR
WILLIAM M. PARKER, JR.,
BY
ATTORNEY

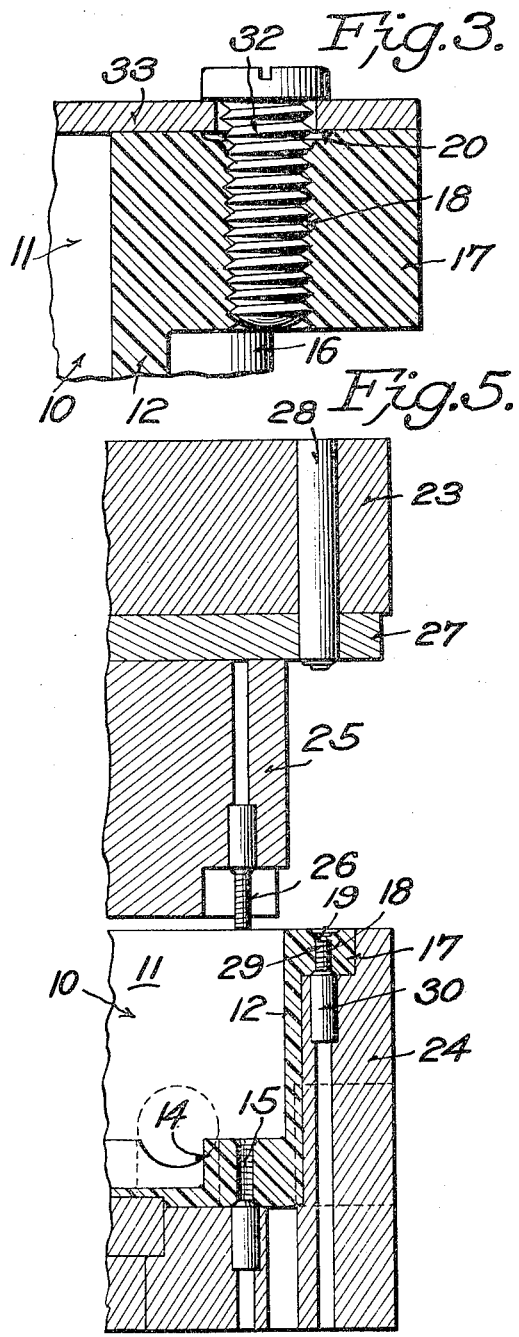

United States Patent Office 2,867,349
Patented Jan. 6, 1959

2,867,349

MOLDED PLASTIC ARTICLES SUCH AS OUTLET BOXES

William M. Parker, Jr., Parkersburg, W. Va., assignor to Union Insulating Co., Inc., Parkersburg, W. Va., a corporation of West Virginia Application October 1, 1953, Serial No. 383,546

1 Claim. (Cl. 220—3.3)

This invention relates to molded plastic articles having screw holes which might become filled with plaster, mortar or the like before the fastener screws are inserted in the holes or openings.

While the invention may be embodied in various articles, it is especially suitable for molded plastic outlet boxes used for mounting electric switches and other fixtures, or for forming junction boxes in electric wiring systems.

When a house or other building structure is erected, the electric cables and outlet boxes are installed before the laths and plaster are applied. The boxes, whether made of metal or insulating material such as phenolic resin, have at their top or outer faces screw threaded openings to receive metal machine screws for the attachment of a cover plate or an electric fixture. When the plastering is done, it frequently happens that plaster will get in the screw holes and prevent the screws from being inserted. The removal of such plaster from the openings and the screw threads therein is a time consuming operation. Various means have been proposed for preventing the screw openings from being filled with plaster during the plastering operation, but all of them, so far as I am informed, have increased the cost of using the boxes either with respect to extra parts or extra labor or both.

The principal object of the invention is to provide over the outer end of the mounting screw receiving hole or socket in a molded plastic outlet box or other article used in electric wiring of buildings, an integral thin film or flash of the plastic to temporarily cover and close the hole to prevent the entrance of plaster, cement or other foreign matter, the flash being easily breakable so that a screw may be readily started and screwed into the hole to fasten a cover or other element to the box.

Another object of the invention is to provide in a part of a molded plastic article, a screw hole or opening which extends from one face of the part to a point closely adjacent its other side with a depression or countersink in said other side concentric with the screw hole, the countersink indicating the location of the hole and hence the area of the breakable film or flash which separates the hole and countersink.

With the above and other objects and advantages in view, the invention resides in the novel combinations and arrangements of parts and the novel features of construction hereinafter described and claimed, and illustrated in the accompanying drawings which show the present preferred embodiment of the invention.

In the drawings, which show the invention embodied in a plastic outlet box and a form of molding apparatus which may be used in making the box, Fig. 1 is a perspective view of a molded plastic outlet box embodying the invention;

Fig. 3 is a view similar to Fig. 2 but with a machine screw in the hole fastening a cover plate or other part to the box;

Fig. 5 is a similar view showing the upper die section in a partially raised position leaving the molded article in the lower section; and Fig. 6 is a similar view showing the upper die section in a higher position and the molded article lifted out of the lower die section by ejector pins.

Figure 1:
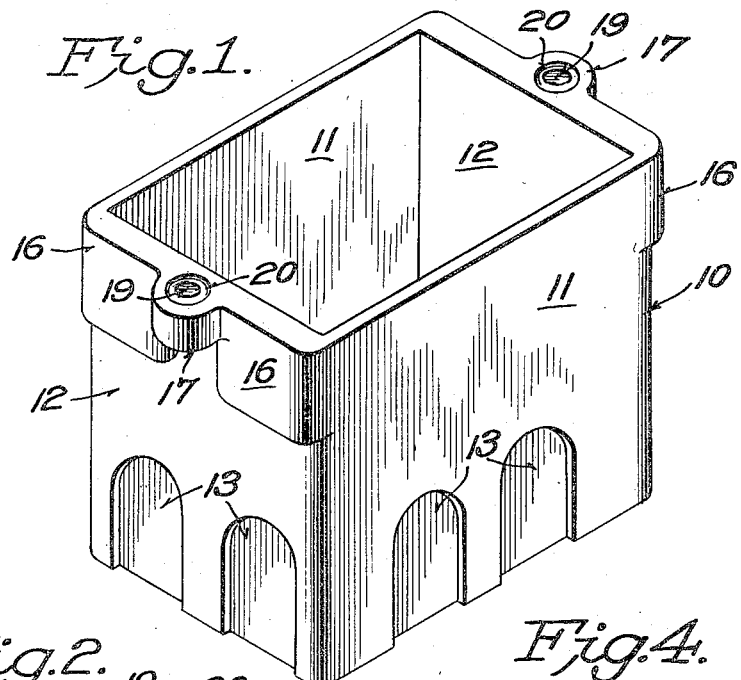

Referring more in detail to the drawings, the numeral 10 denotes as a whole the molded plastic article here shown as an outlet or junction box of rectangular shape but the invention may be used in other articles used in electric wiring such as plaster rings, junction boxes, covers for boxes, etc. In both its side walls 11 and end walls 12 near its bottom are thinned portions forming knock-outs 13 for the entrance of the electric cables. On the inside opposite the knock-outs, the bottom is thickened as at 14 to form seats for the usual metal clamps for the cables, the clamps being fastened by machine screws engaging threaded holes 15 in the portions or seats 14, in a manner similar to that shown in the W. M. Parker Patent No. 2,352,913, July 4, 1944. The walls 12 along their upper portions are thickened to form reinforcements 16, and from the central portions of the latter project lips or ears 17 with screw holes 18 for the attachment by machine screws of a cover plate, an electric fixture or any part to be fastened to the box or other article. While the laterally projecting ears 17 are shown as projecting outwardly they may project inwardly of the wall.

Figure 2:
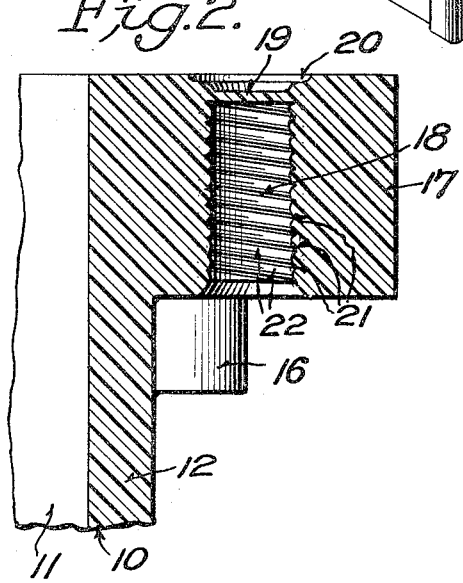
Fig. 2 is a detail sectional view, on an enlarged scale, taken longitudinally through the molded screw hole showing the preferred location of the breakable flash closing the outer end of the hole.

The box or article 10 is preferably molded from a thermosetting plastic material such as phenolic resin and other plastics which are hard and rigid in their molded condition. Such materials have a temporary elasticity immediately after they are molded under heat and pressure between shaping dies, and such temporary elasticity is sufficient to permit a molded article to be removed from dies which have only a straight line movement toward and from each other, even if the article has a slight projection or recess extending transverse to the direction of separation of the article from die parts. This principle is utilized in molding the threaded holes 15 and 18. The molded screw threads in these holes receive standard metal machine screws, as hereinafter described; and they are made in accordance with the invention claimed in the patent application of William E. Baxter and Lewis E. Palmer, Serial No. 384,596, filed October 7, 1953, for Molding of Machine Screw Holes in Plastic Articles, which application has matured in Patent No. 2,775,916 January 1, 1957. These threads are shaped by threaded pins of such design that they may be stripped from the holes without damage to the molded threads if the stripping is done while the molded box or article is still hot and before the plastic material takes its final set. However in molding the holes 18 in the plastic ears 17, the molding pins do not extend entirely through the part but terminate short of one face of the molded part, such as the outer face of the lip or ear 17, so that a thin film or flash 19 of the plastic is formed to close the hole at its outer end, as clearly shown in Fig. 2. While this flash, which forms a temporary cap or cover for the outer end of the hole, may be flush with the outer face of the part 17, I preferably also form a slight depression or countersink 20 concentric with the hole in the outer face of the part so that the location of the hole and flash will be definitely indicated. I have found that by giving the hole covering flash or film a thickness of about .010" it is sufficiently strong to prevent plaster, mortar, cement or the like thrown against it from breaking it and at the same time it is not sufficiently thick to prevent the machine screw from being started through it without any particular difficulty.

Figure 4:
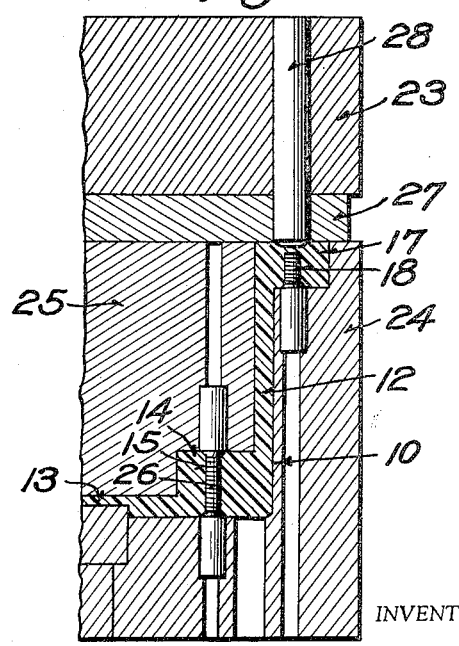
Fig. 4 is a detail vertical section through a portion of a plastic mold for making the plastic article, the two die sections or members being in closed position.

The apparatus for molding the box is conventionally shown in Figs. 4, 5 and 6. The stationary member or section 24 of the press has die parts which mold the exterior of the box, while the movable member 23 has a core portion 25 which shapes the interior of the box. While the movable member 23 is shown as the upper member of the press, it will be understood that the stationary member 24 may be the upper member depending upon the press design. It will also be understood that the die parts of the mold may be inverted or in reversed positions. The core portion carries pins with suitably threaded ends 26 to mold the holes 15. The member 23 has a die plate 27 which shapes the upper or open top of the box, and extending through it are pins 28 with their lower ends shaped to form the countersinks 20 and the outer faces of the flashes 19. The holes 18 are formed by suitably threaded portions 29 on pins 30 mounted in the member 24. The thread-forming portions of the pins 30 have a length such that their flat upper ends will be slightly spaced from the lower ends of the pins 28 when the press is closed as shown in Fig. 4. The member 24 has a plurality of slidable ejector pins 31 operated in timed relation with the movement of the other member in the usual manner of presses of this character.

With the press open the charge of phenolic resin material is placed in the cavity of the lower section. When the press is closed the material under heat and pressure will fill the molding space and be given the shape of the latter. As the press is opened the upper section will first move to the position shown in Fig. 5, stripping the pins 26 from the holes 15 and leaving the molded article in the lower section. As the upper section moves further the ejector pins 31 elevate the still hot article, as shown in Fig. 6, the portions 29 of the pins 30 being stripped from the holes 18. The operation can, of course, be made in the reverse order, that is, the molded part being pulled from the cavity with the top section and then ejected from this section. Obviously the threaded molding pins may be backed out of the holes by unscrewing them instead of by stripping.

In Fig. 3 I show an ordinary metal machine screw 32 threaded in the hole 18 for securing a part 33 to the box or other article. The part 33 may be a cover plate for the outlet box or an electric fixture or device. The threads 22 in the holes 15 and 18 are very shallow and have angular valleys 21. They are only shown conventionally in Figs. 2 and 3. While the invention is especially useful for outlet boxes it may be used on plastic rings and covers for such boxes or used on any other type of equipment which is molded of a similar molding material and which is to be used where plaster, mortar, cement or other substances might enter holes in which screws are to be assembled at a later time.

It will be apparent that the use of the invention in outlet boxes and other electric wiring articles will save the cost of extraneous devices for covering the screw holes as well as the labor of applying and removing them. The invention adds nothing to the cost of making the boxes and using them.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

An open face box to be used as an outlet or junction box and adapted to be supported from an unfinished wall or the like with its open outer face disposed adjacent the wall area to be plastered, said box being molded from a rigid plastic material and having at the edge of its open face a part with an outwardly-facing element-mounting screw hole therein, internal screw threads in said hole and of a size to receive a metal machine screw, and a thin flash of the plastic material temporarily closing the screw receiving end of the hole to protect the screw threads therein from plaster during the plastering operation, said flash being molded integrally with said part and being hard but readily breakable when an element-mounting machine screw is to be inserted in the hole, said flash being slightly spaced inwardly from the outer surface of the part at the open face of the box to provide a countersink concentric with the hole to indicate the location of the flash.

References Cited in the file of this patent

UNITED STATES PATENTS

| | | |
|---|---|---|
| 1,370,024 | Kempton | Mar. 1, 1921 |
| 1,462,209 | Miner | July 17, 1923 |
| 1,561,525 | Seabury | Nov. 17, 1925 |
| 1,693,251 | Pick | Nov. 27, 1928 |
| 1,933,117 | Markle | Oct. 31, 1933 |
| 2,015,647 | Martindell | Sept. 24, 1935 |
| 2,113,918 | Kettron | Apr. 12, 1938 |
| 2,190,054 | Cutter et al. | Feb. 13, 1940 |
| 2,352,913 | Parker | July 4, 1944 |
| 2,567,783 | Richardson | Sept. 11, 1951 |